United States Patent [19]

Nagano

[11] 4,446,753

[45] May 8, 1984

[54] ADJUSTABLE LENGTH CRANK ARM FOR A BICYCLE

[75] Inventor: Masashi Nagano, Izumi, Japan

[73] Assignee: Shimano Industrial Company Limited, Osaka, Japan

[21] Appl. No.: 418,630

[22] Filed: Sep. 16, 1982

[30] Foreign Application Priority Data

Sep. 24, 1981 [JP] Japan ............................ 56-141756[U]

[51] Int. Cl.³ .............................................. G05G 1/14
[52] U.S. Cl. .................................. 74/594.1; 74/594.4; 74/600; 403/3; 403/4; 403/359
[58] Field of Search ................... 74/594.1, 594, 594.4, 74/522, 571, 600; 403/3, 4, 359

[56] References Cited

U.S. PATENT DOCUMENTS

| 626,227 | 6/1899 | Gaylor | 74/594.1 |
|---|---|---|---|
| 990,594 | 4/1911 | Roach | 74/522 |
| 2,860,015 | 11/1958 | Matterson | 74/571 R |
| 2,948,558 | 8/1960 | Schultz | 74/522 |
| 4,106,876 | 8/1978 | Tregoning | 403/4 |

FOREIGN PATENT DOCUMENTS

| 9359 | of 1902 | Austria | 74/600 |
|---|---|---|---|
| 2416829 | 12/1979 | France | 74/594.1 |
| 57-173655 | 10/1982 | Japan | 74/600 |
| 849369 | 9/1960 | United Kingdom | 74/571 R |

Primary Examiner—Lawrence J. Staab
Assistant Examiner—Anthony W. Raskub, Jr.
Attorney, Agent, or Firm—Stevens, Davis, Miller & Mosher

[57] ABSTRACT

A crank for a bicycle, which mounts a pedal shaft into a through bore of each crank arm so that the angular position of the pedal shaft can be changed to change the effective length of the crank arms employs first and second adapters, each having a mounting bore for the pedal shaft which is eccentric with respect to the center of the through bore and an engaging portion engageable with one side of the crank arm, the pedal shaft screwing with at least one of the adapters, at least one of the adapters and the crank arm having therebetween an anti-rotation mechanism so that each adapter is fitted into the mounting bore in relation of being changeable in position and non-rotatable at the changed position with respect to the crank arm, the adapters being drawn toward each other to urge the engaging portions to the crank arm, thereby fixing the pedal shaft to the crank arm through each adapter.

6 Claims, 5 Drawing Figures

ADJUSTABLE LENGTH CRANK ARM FOR A BICYCLE

FIELD OF THE INVENTION

This invention relates to a crank for a bicycle, and more particularly to a crank for a bicycle, which is provided with crank arms and pedal shafts.

The crank arms are separate from a crank shaft and then fixed thereto, or are manufactured integrally therewith, and are supported revolvably to a bottom bracket at the bicycle through a crank shaft, the pedal shafts each rotatably carrying a pedal body and constituting together therewith a pedal.

BACKGROUND OF THE INVENTION

Generally, each crank arm is provided with a through bore through which the pedal shaft is fixed thereto mainly by a screw means.

In a racing bicycle, a length between the axis of the crank shaft and the axis of the pedal shaft is determined by the strength of a driver's legs for a pedalling operation. In a conventional bicycle this depends upon the bicycle size.

Conventionally, to provide differing crank arm lengths required the production and stocking of many crank arms of different lengths.

To alleviate the requirement for producing and stocking many crank arms of differing lengths, the inventor has developed a novel crank means wherein the crank arm length is adjustable comprising a crank arm which is provided at the utmost end for mounting the pedal with a through bore larger in diameter than the pedal shaft, an adapter having an eccentric bore for mounting the pedal shaft and at the outer periphery of one axial end a flange larger in diameter than the through bore and at the outer periphery of the other axial end a screw thread, and a nut screwable therewith, so that the adapter is non-rotatably fitted into the through bore but is shiftable in a desired circumferential position and screwed with the nut to be mounted into the through bore.

This crank means, while providing an adjustable length crank arm, is deficient in that the nut loosens by vibrations or impacts during the bicycle's running to produce a gap between the nut and the crank arm so that the adapter, and in turn the pedal supported thereto, is loosened, resulting in the danger of careless separation of the pedal from the crank arm.

SUMMARY OF THE INVENTION

In the light of the above problem, this invention has been designed. An object of the invention is to provide a crank for a bicycle, which can change a length between the axes of a crank shaft and a pedal shaft only by shifting an adapter mounted to a crank arm, while preventing the adapter from loosening and carelessly separating from the crank arm.

The crank of the invention is so constructed that a pair of first and second adapters are fitted into a through bore of each crank arm from opposite sides thereof and have first and second mounting bores eccentric with respect to the through bore. The adapters are provided at the outer peripheries of one axial ends of the mounting bores with first and second engaging portions larger in diameter than the through bore and engageable with both sides of the crank arm respectively. At least one of the first and second mounting bores is provided with a screw threaded portion screwable with the pedal shaft. An anti-rotation mechanism to prevent rotation of the adapter with respect to the crank arm is provided between at least one of first and second adapters and the crank arm, a connecting means is used to draw both the adapters toward each other and connect them, and the pedal shaft is mountable adjustably through the first and second adapters in a predetermined angular position with respect to the center of the through bore and fixed at this position by the first and second adapters urged to both sides of the crank arm, thereby preventing the pedal shaft from loosening after use or carelessly separating from the crank arm.

In other words, this invention is characterized in that a pair of first and second adapters are provided with engaging portions on opposite sides of the crank arm respectively, the engaging portions being drawn toward each other and press-contacted to both sides of the crank arm by use of the connecting means, thereby rigidly fixing the adapters to the crank arm. Thus, the crank of the invention eliminates the problem of a loosening pedal shaft, or the separation of the adapters from the crank shaft by vibrations or impacts during the bicycle's running.

These and other objects of the invention will become more apparent in the description and examples which follow.

DETAILED DESCRIPTION OF THE INVENTION

Figure 1:
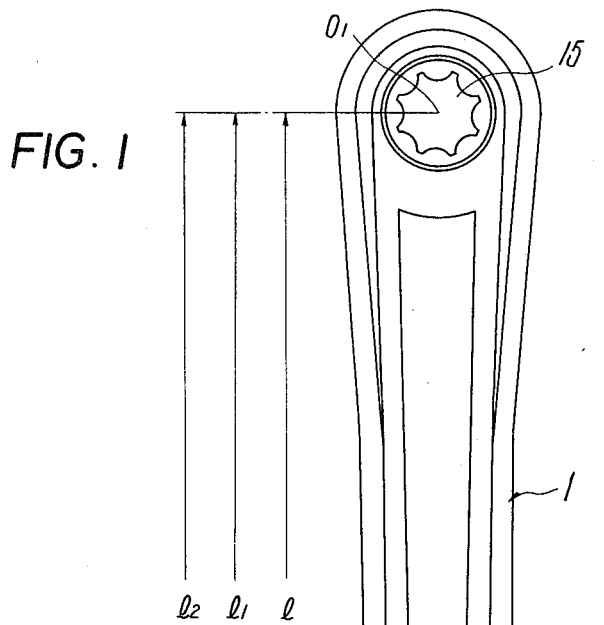
FIG. 1 is a partially cutaway side view of an embodiment of a crank of the invention, from which a pedal shaft is omitted.
Figure 2:
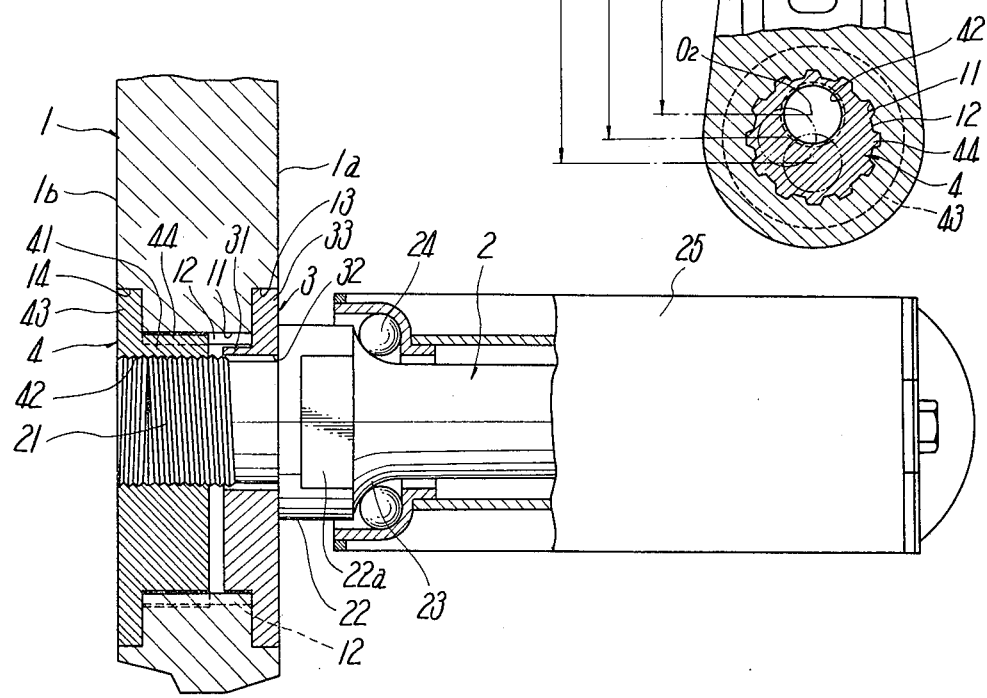
FIG. 2 is a partially enlarged sectional view of a pedal body mounted to the pedal shaft.

Referring to FIGS 1 and 2, a crank arm 1 which is separate from and connectable to a crank shaft, has at an utmost end at a side which mounts a pedal shaft 2 a through bore 11 larger in diameter than the pedal shaft 2, the through bore 11 having at its inner periphery a number of splines 12 or keyways serving as an anti-rotation mechanism.

The pedal shaft 2 is provided at the outer periphery of one axial end portion with a screw threaded portion 21, a larger diameter portion 22, and a ball race 23 in continuation thereof, the larger diameter portion 22 having at the outer periphery thereof control faces 22a for enabling the pedal shaft 2 to be screw at the screw threaded portion 21 with an adapter to be discussed below. The pedal shaft 2 also supports a pedal body 25 rotatably through a pair of ball bearings 24.

The adapter comprises a first adapter 3 and a second adapter 4 and mounts the pedal shaft 2 to the through bore 11 in relation of being shiftable with respect to the center thereof.

The first adapter 3 is fitted rotatably into the through bore 11 from the pedal shaft 2 mounting side and comprises a disc-shaped body 31 having a first mounting bore 32 for mounting therein the pedal shaft 2 which is eccentric with respect to the center of through bore 11, and a first engaging portion 33 which is provided at the outer periphery of body 31 at one axial end of mounting bore 32 or the axial outside of the fitted body 31 and which is larger in diameter than the through bore 11 and engageable with one side 1a of crank arm 1.

The second adapter 4 is fitted into the through bore 11 at the reverse side to the pedal shaft mounting side and comprises a disc-shaped body 41, similar to body 31, having a second eccentric mounting bore 42 which is threaded and a second engaging portion 43 engageable with the opposite side 1b of the crank arm 1.

The second adapter 4 shown in FIGS. 1 and 2 has at the outer periphery of body 41 a number of splines 44 which mesh with splines 12 at the inner periphery of through bore 11.

The first and second engaging portions at the first and second adapters 3 and 4 shown in FIGS. 1 and 2 are formed in round flanges respectively, and annular recesses 13 and 14 in continuation of through bore 11 are provided at both sides of crank arm 1, the first and second engaging portions 33 and 43 being fitted into the recesses 13 and 14 so that the outsides of engaging portions 33 and 43 are level with both outer surfaces 1a and 1b of crank arm 1 respectively. In addition, in FIG. 1, reference numeral 15 designates a bore through which the crank arm 1 is fitted onto a crank shaft.

In this construction, the first adapter 3 is fitted rotatably into the through bore 11 and the second adapter 4, when fitted therein, is desirably changeable in its angular position, but, after being fitted, is not-rotatable due to the engagement of splines 12 at the through bore 11 with those 44 at the body 41 of adapter 4.

The pedal shaft 2 is mounted to the crank shaft 1 in such a manner that the second adapter 4 at first is fitted into the through bore 11 through the spline coupling at a desired angular position with respect to the through bore, and the first adapter 3 is fitted into the through bore 11 from the pedal shaft fitting side and is adjusted to align the first mounting bore 32 with the second mounting bore 42, and then the pedal shaft 2 is inserted into the through bore 11 through the first mounting bore 32 and thereafter screwed with the second mounting bore 42. The screw movement draws the first and second adapters 3 and 4 toward each other to urge the first and second engaging portions 33 and 43 toward the bottoms of annular recesses 13 and 14, whereby the adapters 3 and 4 are fixed to both sides 1a and 1b of crank arm 1 and the pedal shaft 2 is mounted to the crank arm 1 through the adapters 3 and 4 fixed thereto.

Next, when it is desired to change the angular position of pedal shaft 2 mounted to the crank arm 1 with respect to the through bore 11 so as to change a length 1 between the axis $O_1$ of the crank shaft and that $Q_2$ of the pedal shaft 2, as shown in FIG. 1, the pedal shaft 2 is unscrewed from the second adapter 4 and the first and second adapters 3 and 4 are released from the crank arm 1, and thereafter the first adapter 3 is rotated, for example, counterclockwise in FIG. 1 at a desired angle, thus changing its circumferential position. The second adapter 4 drawn out of the through bore 11 is rotated in the same direction and at the same angle with the first adapter 3 and is then engaged at splines 44 with splines 12 at the bore 11 while keeping the mounting bores 32 and 42 in alignment with each other. Then, the pedal shaft 2 is screwed at the screw threaded portion 21 with the second threaded bore 42 at the second adapter 4. Hence, the length is changeable, for example, from 1 to $l_1$ or $l_2$. In this case, the screw movement of pedal shaft 2 draws the first and second adapters 3 and 4 toward each other to urge the engaging portions 33 and 43 toward both sides 1a and 1b of crank arm 1 and also the second adapter 2 is mounted non-rotatably thereto, thereby preventing the adapters 3 and 4 from loosening or carelessly escaping from the crank arm 1 due to vibrations or impacts during the bicycle's running.

Figure 3:
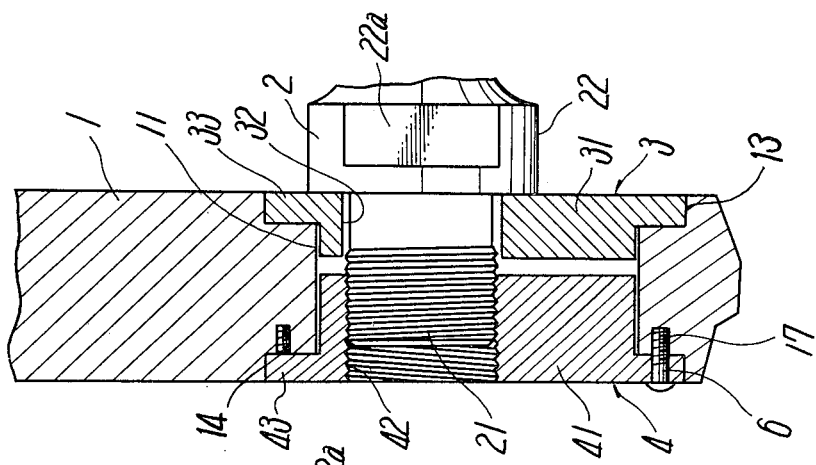
FIG. 3 is a partially enlarged sectional view of the pedal body and pedal shaft, corresponding to FIG. 2, and FIGS. 4 and 5 are partially sectional views of modified embodiments of an anti-rotation mechanism respectively.

Alternatively, the connecting means for drawing the adapters 3 and 4 toward each other in the aforesaid exemplary embodiment of the invention may employ a screw member 5 separate from the pedal shaft 2, as shown in FIG. 3.

In this case, the first mounting bore 32 at the first adapter 3 is formed as a threaded bore screwable with a threaded portion 21 provided at the pedal shaft 2. Therefore, the first adapter 3, when its angular position is to be changed, can be rotated as it screws with the pedal shaft 2. In addition, the adapter 3 in FIG. 3 has splines 34 engageable with those 12 at the through bore 11. Alternatively, the splines 34 may be provided at the second adapter 4.

The screw member 5 may use a nut screwable therewith to draw the adapters 3 and 4, together but mainly screws with a threaded bore 35 provided at the first adapter 3, thereby tightly connecting both the adapters 3 and 4.

Figure 4:
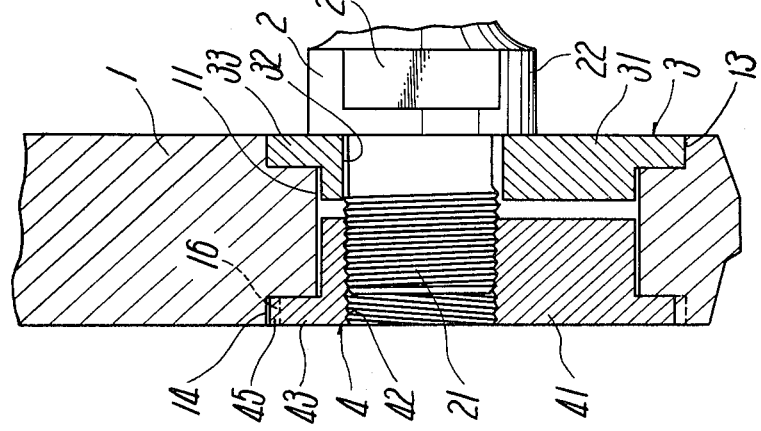

Alternatively, the anti-rotation mechanism, for example, when the second engaging portion 43 has a round flange, may comprise splines 45 provided at the outer periphery of the flange engageable with splines 16 provided at the inner periphery of the annular recess 14 receiving therein the second engaging portion 43 as shown in FIG. 4, or may comprise splines (not shown) extending radially and provided between the engaging portion 33 or 43 and the lateral side 1a or 1b of crank arm 1.

Figure 5:
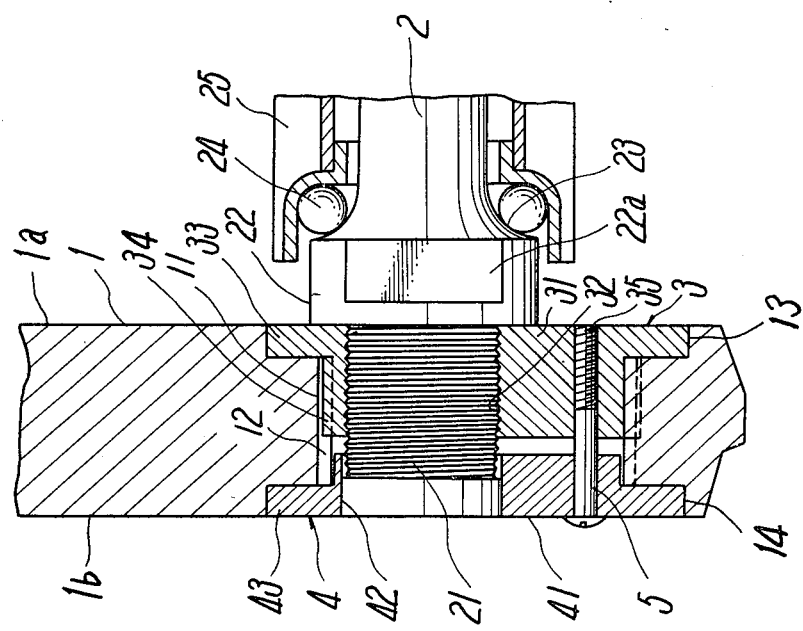

Besides this, the anti-rotation mechanism of the splines may be replaced by, for example, one set-screw 6 provided at the second adapter 4 and a number of threaded bores 17 formed at one side of the crank arm 1 as shown in FIG. 5. In this case, the threaded bores 17 are provided radially outside and around the through bore 11.

The anti-rotation mechanism may alternatively be provided between the crank arm 1 and the first adapter 3, or between the crank arm 1 and both the first and second adapters 3 and 4.

As seen from the above, the crank of the invention can change the length between the axes of the crank shaft and pedal shaft merely by changing the circumferential angular positions of the adapters, and also the first and second adapters in use can be drawn toward each other to be fixed to the crank arm and at least one of first and second adapters is fitted non-rotatably thereto, thereby preventing the adapters from loosening or carelessly separating form the crank arm due to vibrations or impacts during the bicycle's running.

As many apparently widely different embodiments of this invention may be made without departing from the spirit and scope thereof, it is to be understood that the invention is not limited to the specific exemplary embodiments described above but only as defined in the appended claims.

What is claimed is:

1. A crank for a bicycle comprising a crank arm having a through bore at one end thereof and annular recesses in continuation of said through bore on opposite first and second sides of said crank arm, a pedal shaft having a screw threaded portion, a first adapter fitted into said through bore at a pedal shaft mounting side thereof, said first adapter having a first mounting bore which is eccentrically positioned with respect to the center of said through bore and through which said pedal shaft is mounted to said crank arm, said first adapter having at the outer periphery thereof at a side of one axial end of said first mounting bore a first engaging portion larger in diameter than said through bore which is fitted into one of said annular recesses provided at said first side of said crank arm, a second adapter fitted into said through bore on said crank arm at a reverse side to said pedal shaft mounting side, said second adapter having a second mounting bore eccentrically positioned with respect to the center of said through bore and aligned with said first mounting bore, and having at the outer periphery at a side of one axial end of said second mounting bore a second engaging portion larger in diameter than said through bore which is fitted into one of said annular recesses provided at said second side of said crank arm, at least one of said first and second mounting bores at said first and second adapters having a screw threaded portion which is screwable with said screw threaded portion of said pedal shaft, an anti-rotation mechanism comprising a plurality of engaging splines extending axially of said through bore and provided between at least one of said first and second adapters and said crank arm which restrains said adapters from rotating with respect to said crank arm, and a connecting means for connecting and drawing said first and second adapters toward each other.

2. A crank for a bicycle according to claim 1, wherein said second mounting bore at said second adapter is formed as a screw threaded bore, and said screw threaded portion of said pedal shaft is screwed with said second mounting bore, so that said pedal shaft is fixed to said second adapter, and at the same time said first and second adapters are connected with each other.

3. A crank for a bicycle according to claim 1, wherein said first mounting bore at said first adapter is formed as a screw threaded bore, and said screw threaded portion of said pedal shaft is screwed with said first mounting bore so that said pedal shaft is fixed to said first adapter, said connecting means employing a screw member.

4. A crank for a bicycle according to claim 1, wherein said splines are provided at the outer periphery of one of said first and second adapters and at the inner periphery of said through bore opposite to said outer periphery.

5. A crank for a bicycle according to claim 1, wherein said splines are provided between said engaging portion at one of said first and second adapters and said crank arm opposite to said engaging portion.

6. A crank for a bicycle comprising a crank arm having a through bore at one end thereof, a pedal shaft having a screw threaded portion, a first adapter fitted into said through bore at a pedal shaft mounting side thereof, said first adapter having a first mounting bore which is eccentrically positioned with respect to the center of said through bore and through which said pedal shaft is mounted to said crank arm, said first adapter having at the outer periphery thereof at a side of one axial end of said first mounting bore a first engaging portion larger in diameter than said through bore and engageable with a first side of said crank arm, a second adapter fitted into said through bore on said crank arm at a reverse side to said pedal shaft mounting side, said second adapter having a second mounting bore eccentrically positioned with respect to the center of said through bore and aligned with said first mounting bore, and having at the outer periphery at a side of one axial end of said second mounting bore a second engaging portion larger in diameter than said through bore and engageable with a second side of said crank arm, at least one of said first and second mounting bores at said first and second adapters having a screw threaded portion which is screwable with said screw threaded portion of said pedal shaft, an anti-rotation mechanism comprising a plurality of threaded bores provided circumferentially around said through bore and at least one set screw projecting through the engaging portion provided at one of said first and second adapters and screwable with one of said threaded bores, said anti-rotation mechanism restraining said adapters from rotating with respect to said crank arm, and a connecting means for connecting and drawing said first and second adapters toward each other.

* * * * *